US009931952B2

United States Patent
Tripathi et al.

(10) Patent No.: US 9,931,952 B2
(45) Date of Patent: Apr. 3, 2018

(54) ELECTRIC VEHICLE WIRELESS CHARGING WITH MONITORING OF DURATION OF CHARGING OPERATIONAL MODE

(71) Applicant: QUALCOMM, Incorporated, San Diego, CA (US)

(72) Inventors: Manish Tripathi, San Diego, CA (US); Rao S. Yenamandra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 13/925,655

(22) Filed: Jun. 24, 2013

(65) Prior Publication Data

US 2014/0002015 A1 Jan. 2, 2014

Related U.S. Application Data

(60) Provisional application No. 61/665,205, filed on Jun. 27, 2012.

(51) Int. Cl.
*H02J 7/00* (2006.01)
*B60L 11/18* (2006.01)
(Continued)

(52) U.S. Cl.
CPC ........... *B60L 11/182* (2013.01); *B60L 3/0069* (2013.01); *B60L 11/1833* (2013.01);
(Continued)

(58) Field of Classification Search
CPC ...................................... H02J 7/025
(Continued)

(56) References Cited

U.S. PATENT DOCUMENTS 8,234,189 B2 7/2012 Taylor et al.
2010/0145885 A1 6/2010 Graziano et al.
(Continued)

FOREIGN PATENT DOCUMENTS

CN 102118069 A 7/2011
JP 2010093957 A 4/2010
(Continued)

OTHER PUBLICATIONS

International Search Report and Written Opinion—PCT/US2013/047676—ISA/EPO—dated Nov. 25, 2013.

*Primary Examiner* — Drew A Dunn
*Assistant Examiner* — Zixuan Zhou
(74) *Attorney, Agent, or Firm* — Knobbe, Martens, Olson & Bear, LLP

(57) ABSTRACT

Systems, methods, and apparatus are disclosed for electric vehicle wireless charging. In one aspect, a method of transferring wireless power to an electric vehicle is provided, including initiating a charging cycle comprising at least one initialization state during which a wireless power link sufficient for charging is established between the wireless power transfer system and the electric vehicle and at least one charging state during which wireless power transfer from the wireless power transfer system to the electric vehicle is performed. The method further includes generating a first timestamp indicating a start time of the wireless power transfer in response to entering the at least one charging state and generating a second timestamp indicating an end time of the wireless power transfer.

31 Claims, 18 Drawing Sheets

(51) Int. Cl.
*H02J 50/80* (2016.01)
*H02J 50/90* (2016.01)
*H02J 50/12* (2016.01)
*H02J 50/40* (2016.01)
*H02J 50/60* (2016.01)
*H02J 50/70* (2016.01)
*H02J 5/00* (2016.01)
*H02J 7/02* (2016.01)
*B60L 3/00* (2006.01)

(52) U.S. Cl.
CPC ....... *B60L 11/1842* (2013.01); *B60L 11/1844* (2013.01); *B60L 11/1846* (2013.01); *B60L 11/1848* (2013.01); *B60L 11/1877* (2013.01); *H02J 5/005* (2013.01); *H02J 7/025* (2013.01); *H02J 50/12* (2016.02); *H02J 50/40* (2016.02); *H02J 50/60* (2016.02); *H02J 50/70* (2016.02); *H02J 50/80* (2016.02); *H02J 50/90* (2016.02); *B60L 2210/30* (2013.01); *B60L 2210/40* (2013.01); *B60L 2240/36* (2013.01); *B60L 2240/80* (2013.01); *Y02E 60/721* (2013.01); *Y02T 10/705* (2013.01); *Y02T 10/7005* (2013.01); *Y02T 10/7072* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01)

(58) Field of Classification Search
USPC ..................................... 320/108–109; 701/22
See application file for complete search history.

(56) References Cited

U.S. PATENT DOCUMENTS

| | | | |
|---|---|---|---|
| 2010/0185357 | A1 | 7/2010 | Mizumachi |
| 2011/0057613 | A1* | 3/2011 | Taguchi .............. B60L 11/1816 320/109 |
| 2011/0187320 | A1 | 8/2011 | Murayama |
| 2011/0204845 | A1* | 8/2011 | Paparo .................... H01F 38/14 320/108 |
| 2011/0276448 | A1 | 11/2011 | Perper et al. |
| 2012/0025761 | A1 | 2/2012 | Takada et al. |
| 2012/0091959 | A1 | 4/2012 | Martin et al. |
| 2012/0112696 | A1* | 5/2012 | Ikeda .................. B60L 11/1816 320/109 |
| 2012/0206098 | A1 | 8/2012 | Kim |
| 2013/0015812 | A1* | 1/2013 | Boyer .................. B60L 11/182 320/108 |
| 2013/0119947 | A1 | 5/2013 | Ishida et al. |

FOREIGN PATENT DOCUMENTS

| | | |
|---|---|---|
| JP | 2010187451 A | 8/2010 |
| JP | 2011160505 A | 8/2011 |
| JP | 2012034468 A | 2/2012 |
| WO | WO-2011021973 A1 | 2/2011 |
| WO | WO-2012014485 A2 | 2/2012 |

* cited by examiner

9,931,952 B2

ELECTRIC VEHICLE WIRELESS CHARGING WITH MONITORING OF DURATION OF CHARGING OPERATIONAL MODE

RELATED APPLICATIONS

This application claims the benefit of priority of U.S. Provisional Appl. No. 61/665,205, entitled "SYSTEMS, METHODS, AND APPARATUS RELATED TO ELECTRICA VEHICLE WIRELESS CHARGING," filed Jun. 27, 2012, the entirety of which is incorporated herein by reference.

FIELD

The present disclosure relates generally to wireless power transfer, and more specifically to devices, systems, and methods related to wireless power transfer to remote systems such as vehicles including batteries and communications therebetween.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles are needed.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a method of transferring wireless power to an electric vehicle. The method comprises initiating a charging cycle of a wireless power transfer system. The charging cycle comprises a plurality of operational states comprising at least one initialization state during which a wireless power link sufficient for charging is established between the wireless power transfer system and the electric vehicle, and at least one charging state during which wireless power transfer from the wireless power transfer system to the electric vehicle is performed. The method further comprises generating a first timestamp indicating a start time of the wireless power transfer in response to entering the at least one charging state. The method further comprises generating a second timestamp indicating an end time of the wireless power transfer.

Another aspect of the subject matter described in this disclosure provides a wireless power apparatus for charging an electric vehicle comprising a vehicle pad having at least one electric vehicle induction coil. The apparatus comprises a base pad having at least one base system induction coil. The apparatus further comprises a processor configured to control a charging cycle of the apparatus. The charging cycle comprises at least one initialization state during which a wireless power link sufficient for charging is established between the wireless power apparatus and the electric vehicle and at least one charging state during which wireless power transfer from the wireless power apparatus to the electric vehicle is performed. The processor is further configured to generate a first timestamp indicating a start time of the wireless power transfer in response to entering the at least one charging state and to generate a second timestamp indicating an end time of the wireless power transfer.

Another aspect of the subject matter described in this disclosure provides a wireless power apparatus for charging an electric vehicle comprising a vehicle pad having at least one electric vehicle induction coil. The apparatus comprises means for wirelessly transferring power from the apparatus to the vehicle pad. The apparatus further comprises means for controlling a charging cycle of the apparatus. The charging cycle comprises at least one initialization state during which a wireless power link sufficient for charging is established between the wireless power apparatus and the electric vehicle and at least one charging state during which wireless power transfer from the wireless power apparatus to the electric vehicle is performed. The apparatus further comprises means for generating a first timestamp indicating a start time of the wireless power transfer in response to entering the at least one charging state and means for generating a second timestamp indicating an end time of the wireless power transfer.

Another aspect of the subject matter described in this disclosure provides a non-transitory computer-readable medium comprising instructions that, when executed by one or more processors, cause a wireless power transfer system for charging an electric vehicle to initiate a charging cycle comprising a plurality of operational states. The plurality of operational states comprises at least one initialization state during which a wireless power link sufficient for charging is established between the wireless power transfer system and the electric vehicle. The plurality of operational states further comprises at least one charging state during which wireless power transfer from the wireless power transfer system to the electric vehicle is performed. The computer-readable medium further comprises instructions that, when executed by the one or more processors, cause the wireless power transfer system to generate a first timestamp indicating a start time of the wireless power transfer in response to entering the at least one charging state and to generate a second timestamp indicating an end time of the wireless power transfer.

Figure 1:
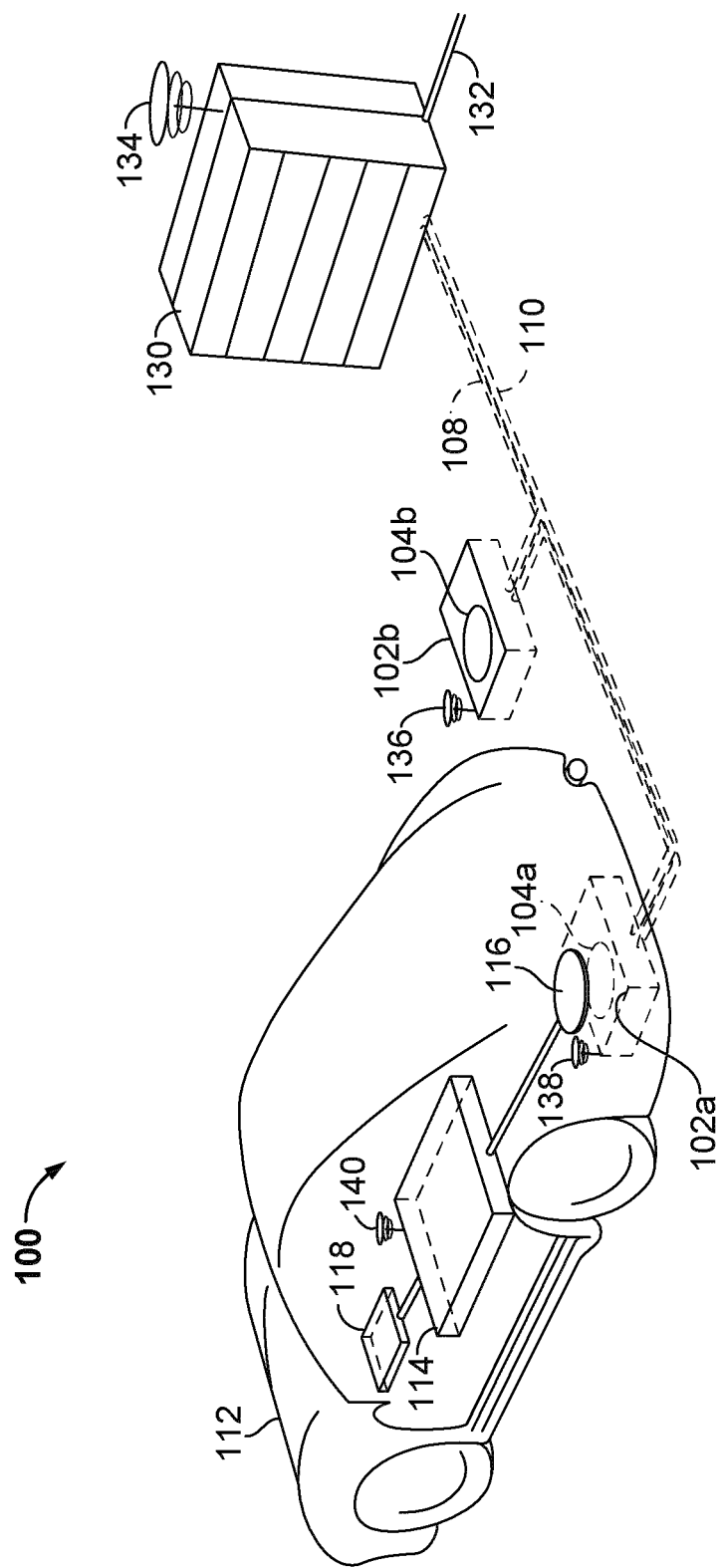
FIG. 1 illustrates a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power and an antenna 136. An electric vehicle 112 may include a battery unit 118, an electric vehicle induction coil 116, an electric vehicle wireless charging system 114, and an antenna 140. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112 (e.g., to charge the battery unit 118). In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about ½π of wavelength of the base system induction coil 104a (and vice versa for the electric vehicle induction coil 116) as will be further described below.

Local distribution center 130 may be configured to communicate with external sources (e.g., a power grid) via a communication backhaul 134, and with the base wireless charging system 102a via a communication link 108.

Base wireless charging systems 102a and 102b may be configured to communicate with the electric vehicle wireless charging system 114 via antennas 136 and 138. For example, the wireless charging system 102a may communicate with the electric vehicle wireless charging system 114 using a communication channel between antennas 138 and 140. The communication channels may be any type of communication channels such as, for example, Bluetooth, zigbee, cellular, wireless local area network (WLAN), etc.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
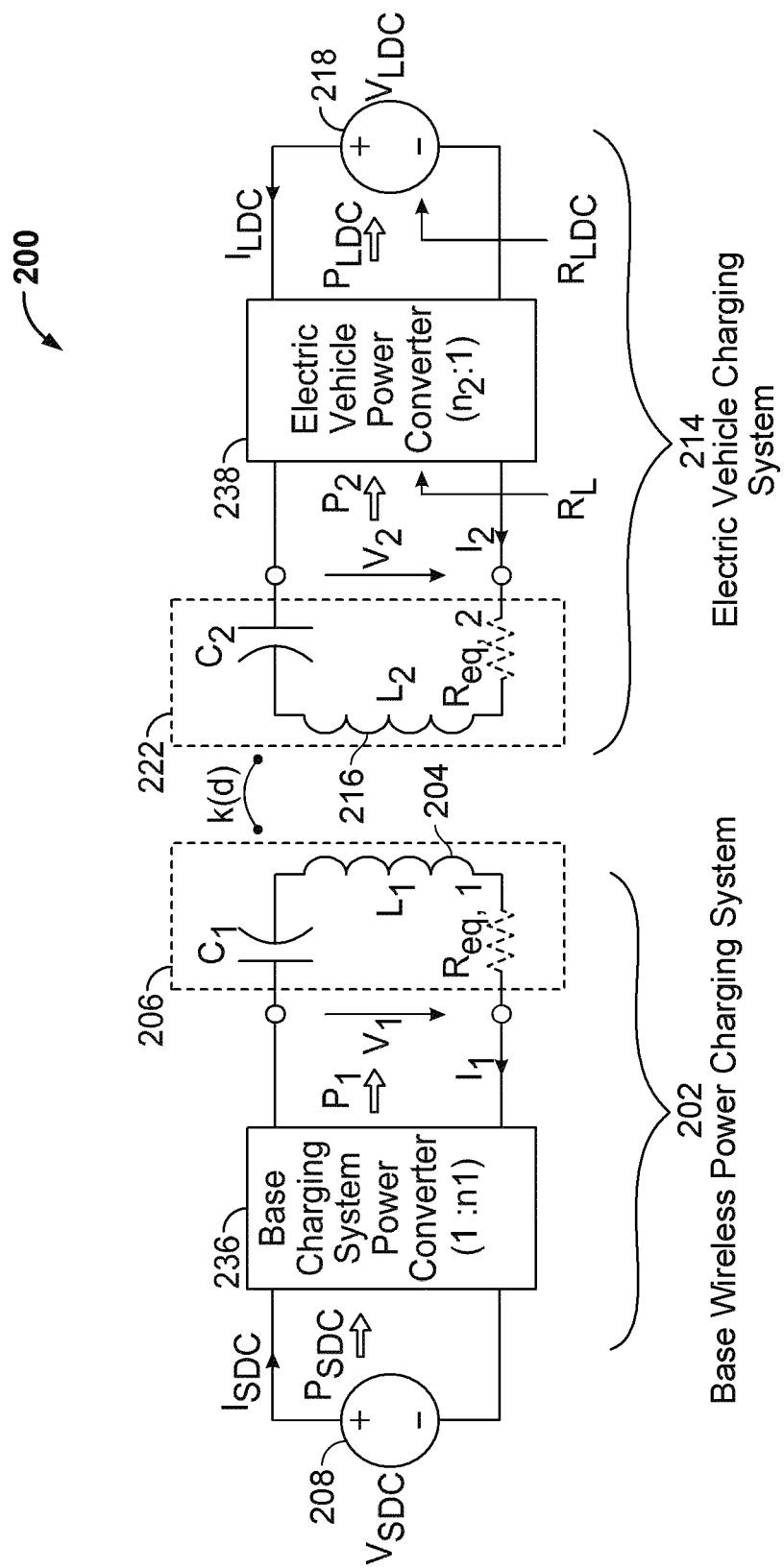
FIG. 2 illustrates a schematic diagram of exemplary core components of the wireless power transfer system of FIG. 1.

FIG. 2 is a schematic diagram of exemplary components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver.

However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
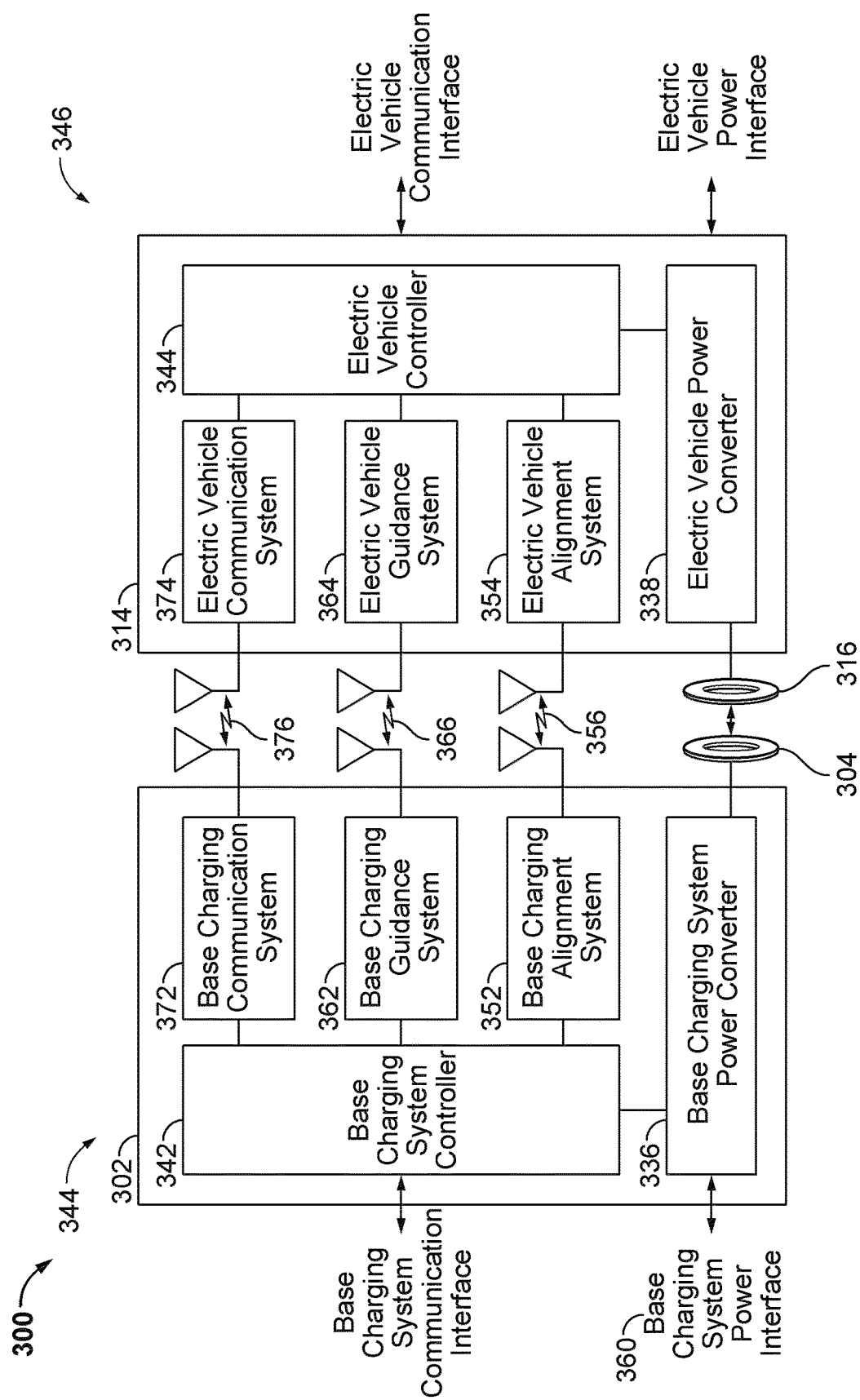
FIG. 3 illustrates another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 360 may be configured to provide power to a charging system power converter 336 from a power source, such as an AC or DC power supply 126. The base charging system power converter 336 may receive AC or DC power from the base charging system power interface 360 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 314 includes an electric vehicle controller 344. The base charging system controller 342 may include a base charging system communication interface to other systems (not shown) such as, for example, a computer, a wireless device, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 356 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link 366 to provide a feedback mechanism to guide an operator in aligning the base system induction coil 304 and electric vehicle induction coil 316. In addition, there may be separate general-purpose communication links (e.g., channels), such as communication link 376, supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication links or channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-added services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 4:
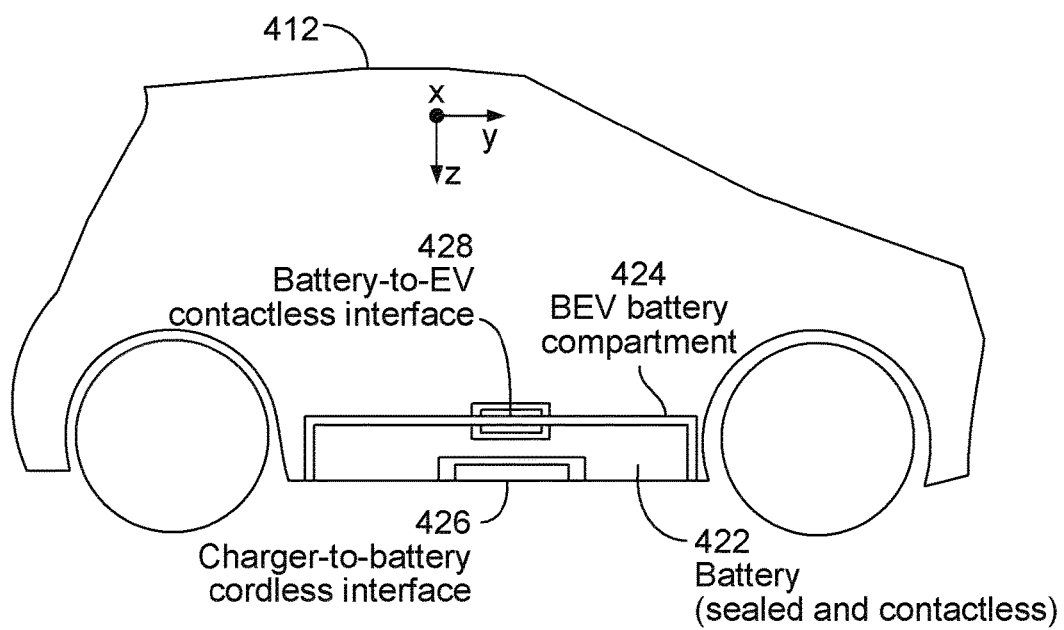
FIG. 4 illustrates a functional block diagram showing a replaceable contactless battery disposed in an electric vehicle, in accordance with an exemplary embodiment of the invention.

The wireless power transfer system 100 described may be used with a variety of electric vehicles 102 including rechargeable or replaceable batteries. FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 422, and a charger-to-battery cordless interface 426 that provides contactless power and communication between the electric vehicle 412 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

Figure 5A:
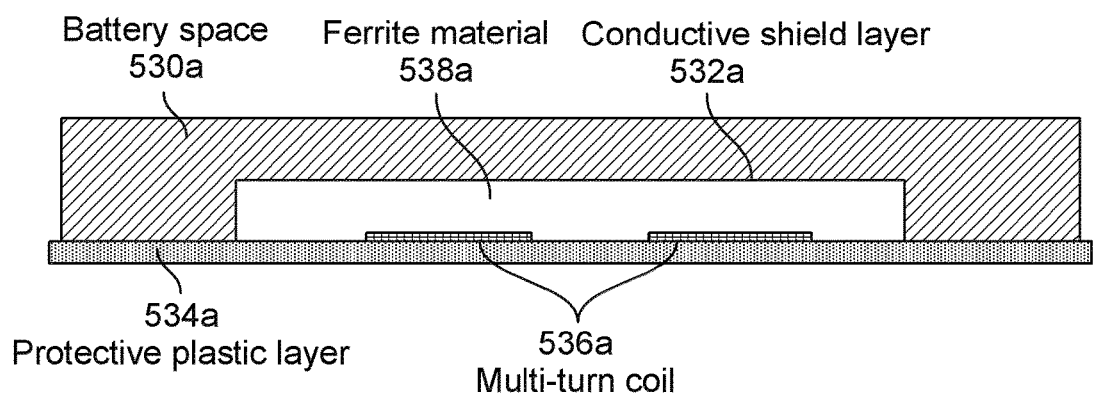
FIGS. 5A, 5B, 5C, and 5D are diagrams of exemplary configurations for the placement of an induction coil and ferrite material relative to a battery, in accordance with exemplary embodiments of the invention.

FIGS. 5A, 5B, 5C, and 5D are diagrams of exemplary configurations for the placement of an induction coil and ferrite material relative to a battery, in accordance with exemplary embodiments of the invention. FIG. 5A shows a fully ferrite embedded induction coil 536a. The wireless power induction coil may include a ferrite material 538a and a coil 536a wound about the ferrite material 538a. The coil 536a itself may be made of stranded Litz wire. A conductive shield layer 532a may be provided to protect passengers of the vehicle from excessive EMF transmission. Conductive shielding may be particularly useful in vehicles made of plastic or composites.

Figure 5B:
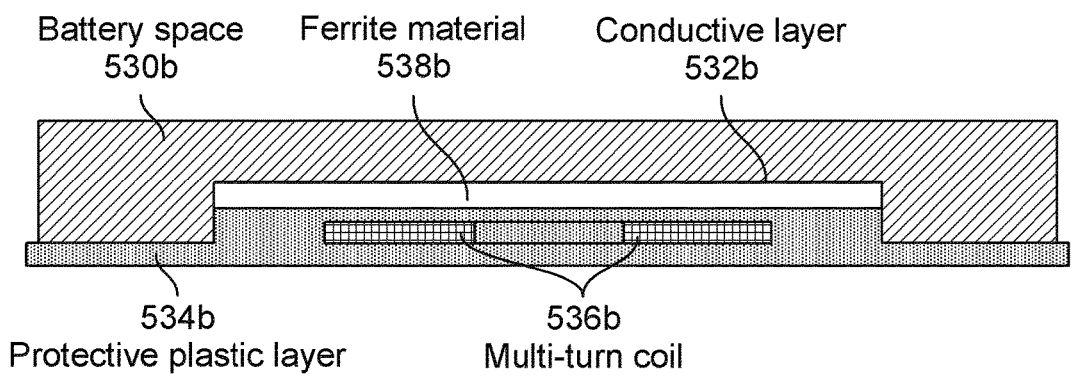

FIG. 5B shows an optimally dimensioned ferrite plate (i.e., ferrite backing) to enhance coupling and to reduce eddy currents (heat dissipation) in the conductive shield 532b. The coil 536b may be fully embedded in a non-conducting non-magnetic (e.g., plastic) material. For example, as illustrated in FIG. 5A-5D, the coil 536b may be embedded in a protective housing 534b. There may be a separation between the coil 536b and the ferrite material 538b as the result of a trade-off between magnetic coupling and ferrite hysteresis losses.

Figure 5C:
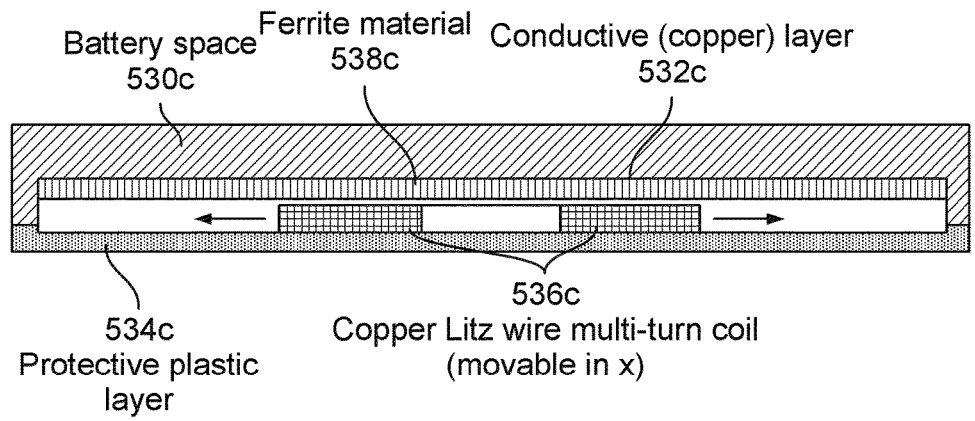
Figure 5D:
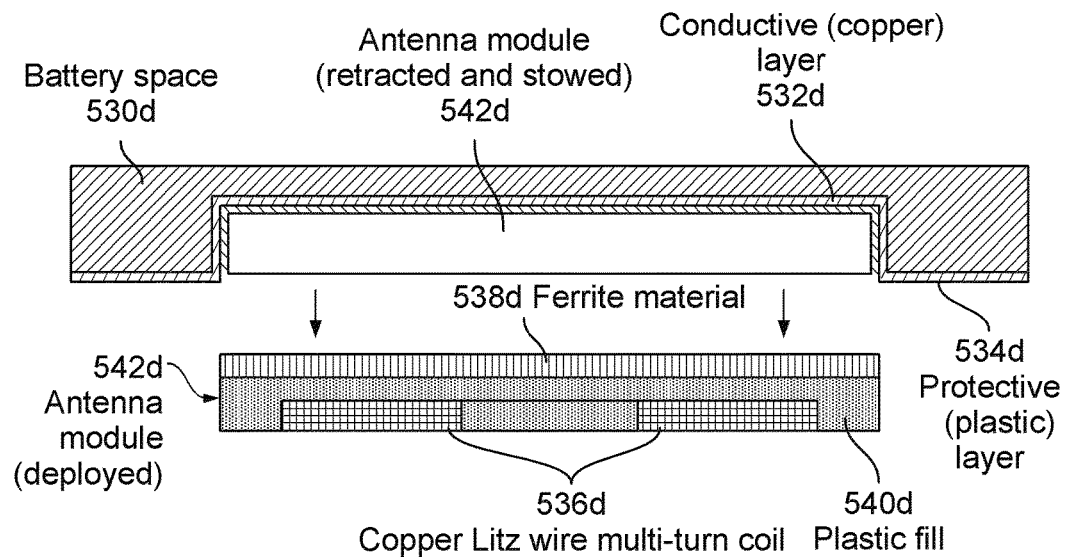

FIG. 5C illustrates another embodiment where the coil 536c (e.g., a copper Litz wire multi-turn coil) may be movable in a lateral ("X") direction. FIG. 5D illustrates another embodiment where the induction coil module is deployed in a downward direction. In some embodiments, the battery unit includes one of a deployable and non-deployable electric vehicle induction coil module 542d as part of the wireless power interface. To prevent magnetic fields from penetrating into the battery space 530d and into the interior of the vehicle, there may be a conductive layer shield 532d (e.g., a copper sheet) between the battery space 530d and the vehicle. Furthermore, a non-conductive (e.g., plastic) protective layer 534d may be used to protect the conductive layer shield 532d, the coil 536d, and the ferrite material 538d from environmental impacts (e.g., mechanical damage, oxidization, etc.). Furthermore, the coil 536d may be movable in lateral X and/or Y directions. FIG. 5D illustrates an embodiment wherein the electric vehicle induction coil module 540d is deployed in a downward Z direction relative to a battery unit body.

The design of this deployable electric vehicle induction coil module 542d is similar to that of FIG. 5B except there is no conductive shielding at the electric vehicle induction coil module 542d. The conductive shield 532d stays with the battery unit body. The protective layer 534d (e.g., plastic layer) is provided between the conductive shield 532d and the electric vehicle induction coil module 542d when the electric vehicle induction coil module 542d is not in a deployed state. The physical separation of the electric vehicle induction coil module 542d from the battery unit body may have a positive effect on the induction coil's performance.

As discussed above, the electric vehicle induction coil module 542d that is deployed may contain only the coil 536d (e.g., Litz wire) and ferrite material 538d. Ferrite backing may be provided to enhance coupling and to prevent from excessive eddy current losses in a vehicle's underbody or in the conductive layer shield 532d. Moreover, the electric vehicle induction coil module 542d may include a flexible wire connection to power conversion electronics and sensor electronics. This wire bundle may be integrated into the mechanical gear for deploying the electric vehicle induction coil module 542d.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. Guidance systems (not shown) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

Figure 6:
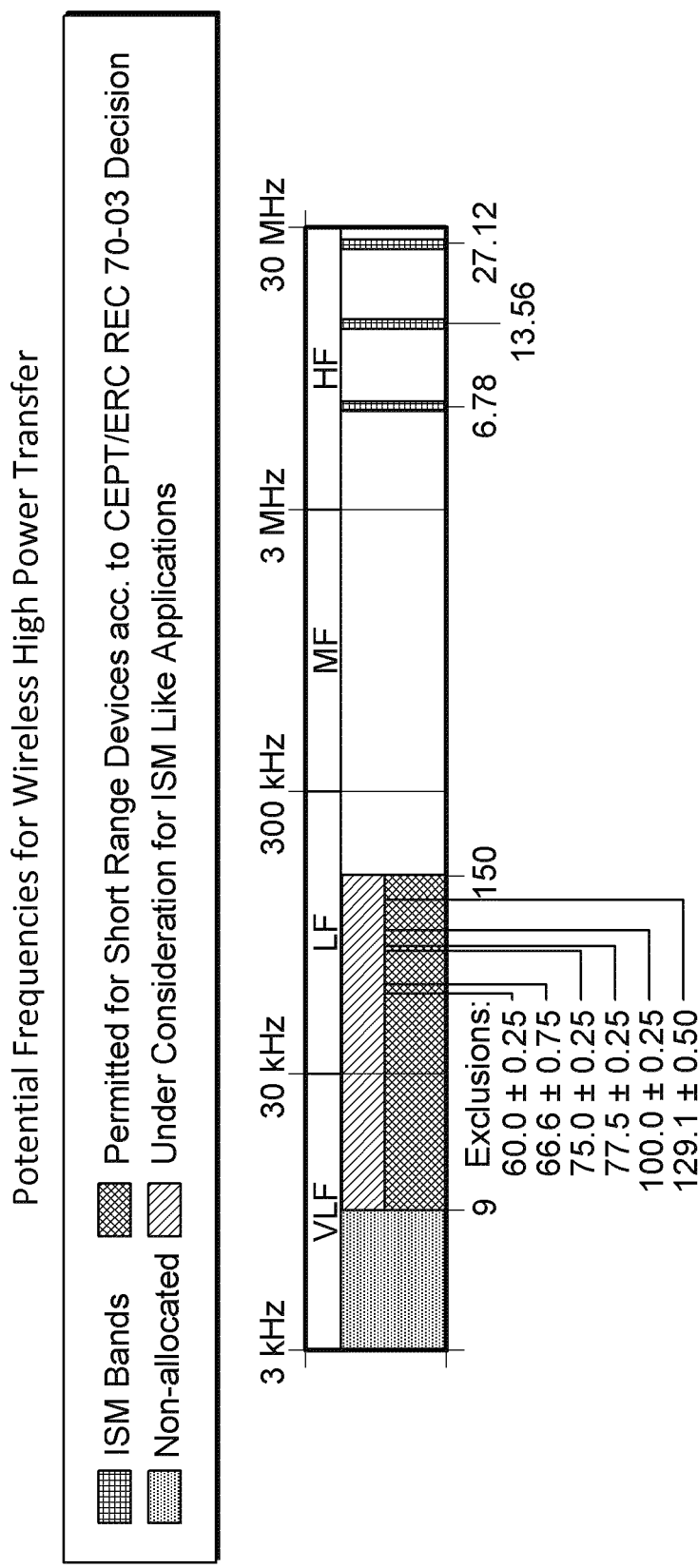
FIG. 6 is a chart of a frequency spectrum showing exemplary frequencies that may be available for wireless charging an electric vehicle, in accordance with an exemplary embodiment of the invention.

FIG. 6 is a chart of a frequency spectrum showing exemplary frequencies that may be used for wireless charging an electric vehicle, in accordance with an exemplary embodiment of the invention. As shown in FIG. 6, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 7:
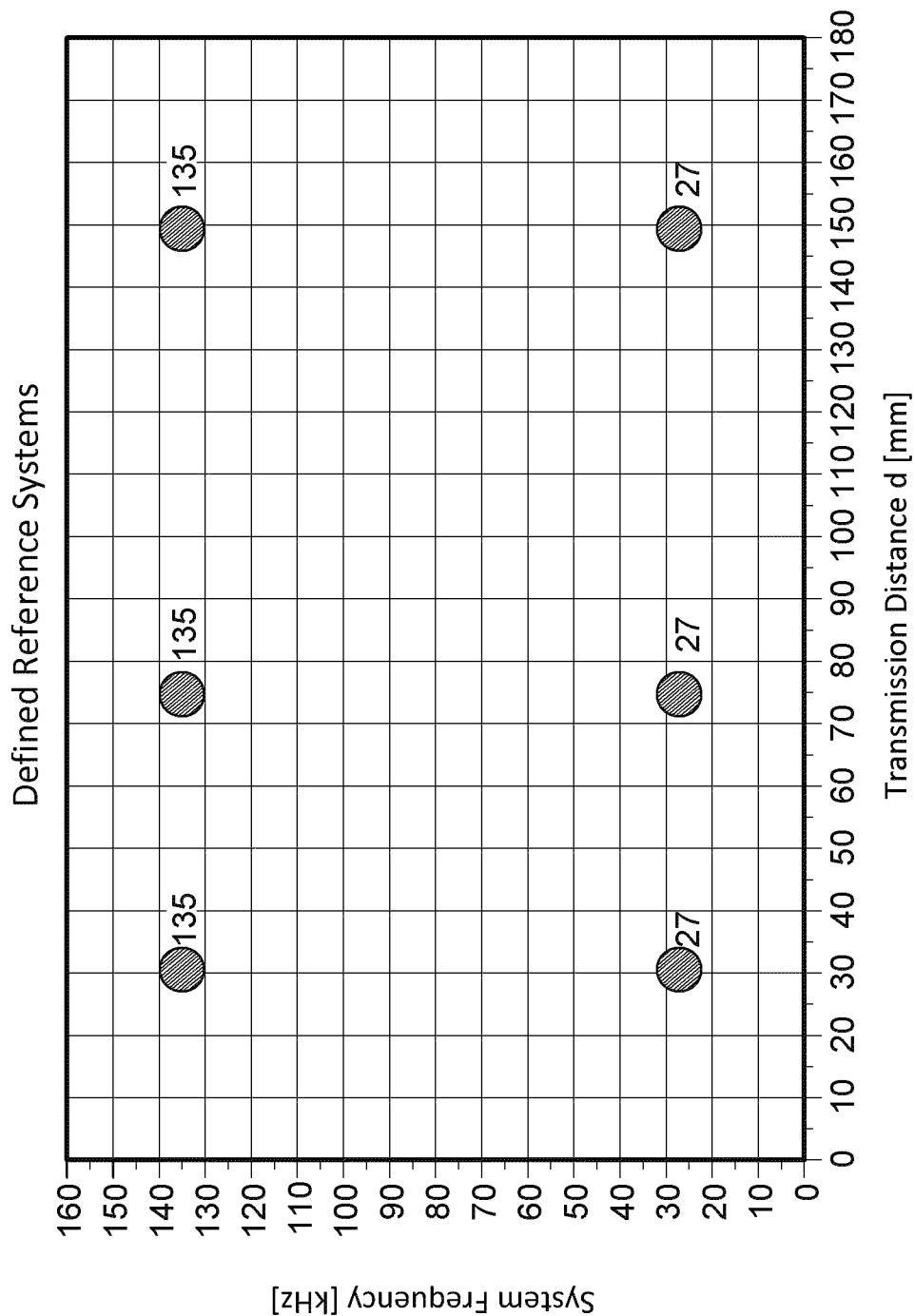
FIG. 7 is a chart showing exemplary frequencies and transmission distances that may be useful in wireless charging electric vehicles, in accordance with an exemplary embodiment of the invention.

FIG. 7 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

During a charging cycle of an electric vehicle, a Base Charging Unit (BCU) of the wireless power transfer system may go through various states of operation. The wireless power transfer system may be referred to as a "charging system." The BCU may include the base wireless charging system 102a and/or 102b of FIG. 1. The BCU may also include a controller and/or a power conversion unit, such as power converter 236 as illustrated in FIG. 2. Further, the BCU may include one or more base charging pads that include an induction coil, such as induction coils 104a and 104b as illustrated in FIG. 1. As the BCU goes through the various operational states of the charging cycle, the BCU interacts with a charging station. The charging station may include the local distribution center 130, as illustrated in FIG. 1, and may further include a controller, a graphical user interface, a communications module, and a network connection to a remote server or group of servers.

Figure 8:
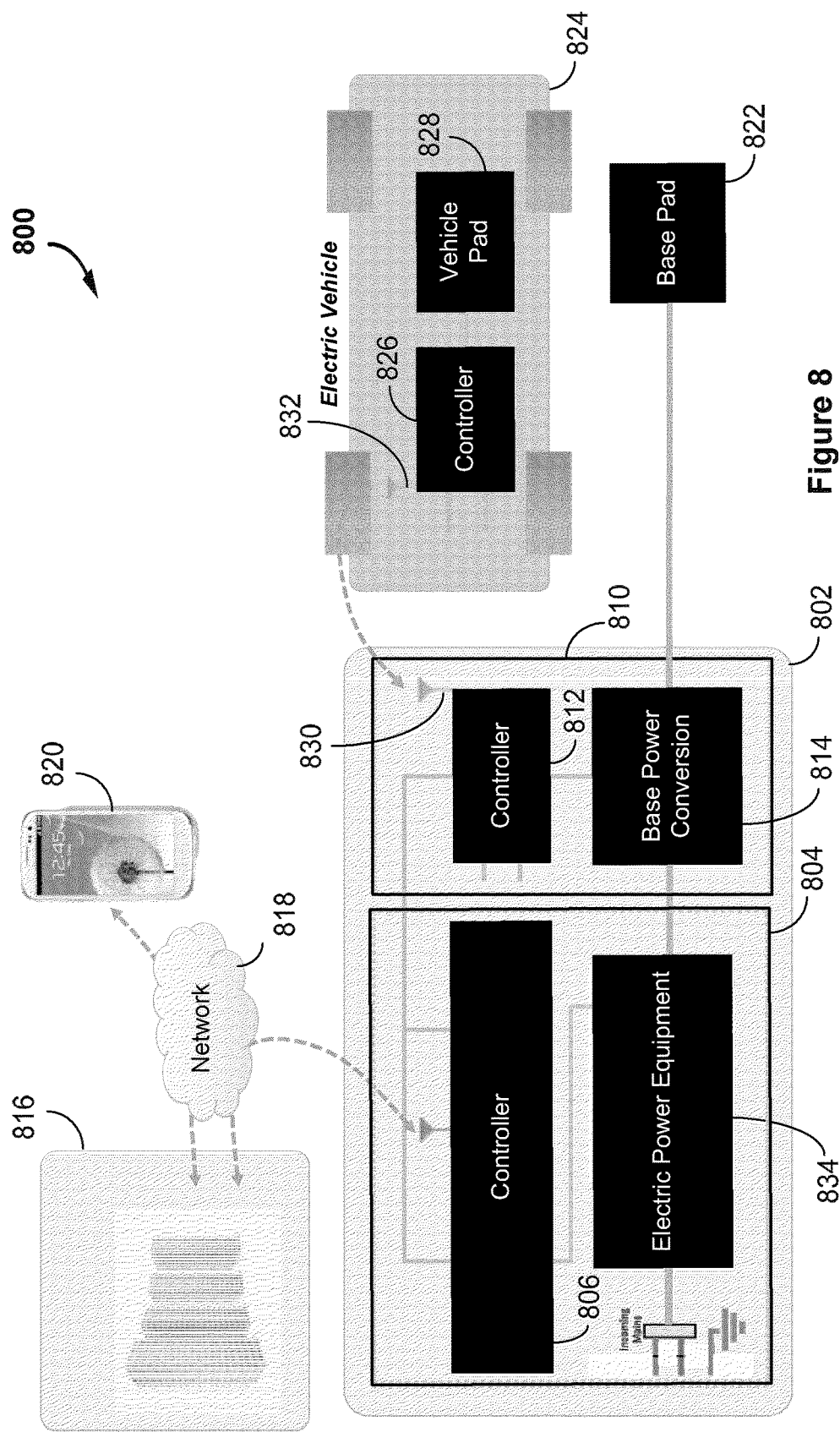
FIG. 8 illustrates a functional block diagram of a wireless power transfer system, in accordance with an exemplary embodiment of the invention.

FIG. 8 illustrates an exemplary block diagram of a wireless power transfer system, such as a charging system 800. The charging system 800 includes a power supply unit 802. The power supply unit 802 includes a charging station 804 and a Base Charging Unit (BCU) 810. The charging station 804 may include an input that receives power from a main power supply and feeds into electric power equipment 834. In some aspects, the electric power equipment 834 includes one or more fuses and/or circuit breakers, a residual current device, and/or a contactor. For example, the output of the fuses and/or circuit breakers may be fed into the residual current device for added protection from electric shock, and the contactor may be used to distribute the power to the various components of charging system 800. The charging station 804 may also include a controller 806 for controlling operations of the charging station 804. In some aspects, the controller 806 may include a graphical user interface (GUI)/communications module. For example, the GUI/communications module may allow a user to communicate with the system via a user input device, such as a touchscreen, a keypad, or any other suitable user input device. The controller 806, using, for example, a GUI/communications module, may also allow the charging station 804 to communicate with one or more servers 816 and/or a remote user device 820 via network 818. The network 818 may be any type of communication network such as, for example, the Internet, a wide area network (WAN), a wireless local area network (WLAN), etc. The power supply unit 802 further includes the BCU 810. The BCU 810 includes a controller 812 and a base power conversion unit 814. The base power conversion unit 814 may receive power from the electric power equipment 834 and output power to a base pad 822, using, for example, a power transmitter. In some aspects, the BCU 810 may be separated from the power supply unit 802 and operated as a stand-alone unit. In some aspects, the base pad 822 may be included in the BCU 810. In some aspects, the base pad 822 includes a base system induction coil, such as the base system induction coil 104 illustrated in FIG. 1. The BCU 810 includes an antenna 830 that may be used to communicate with a Vehicle Charging Unit (VCU) of an electric vehicle 824 via antenna 832. The VCU may include the controller 826 and vehicle pad 828. In some aspects, the VCU may include only the controller 826. The communication channel between antennas 830 and 832 may be any type of communication channel such as, for example, Bluetooth, zigbee, cellular, WLAN, etc. In response to communications between BCU 810 and VCU, the BCU 810 may communicate with the charging station 804, as described below.

Figure 9:
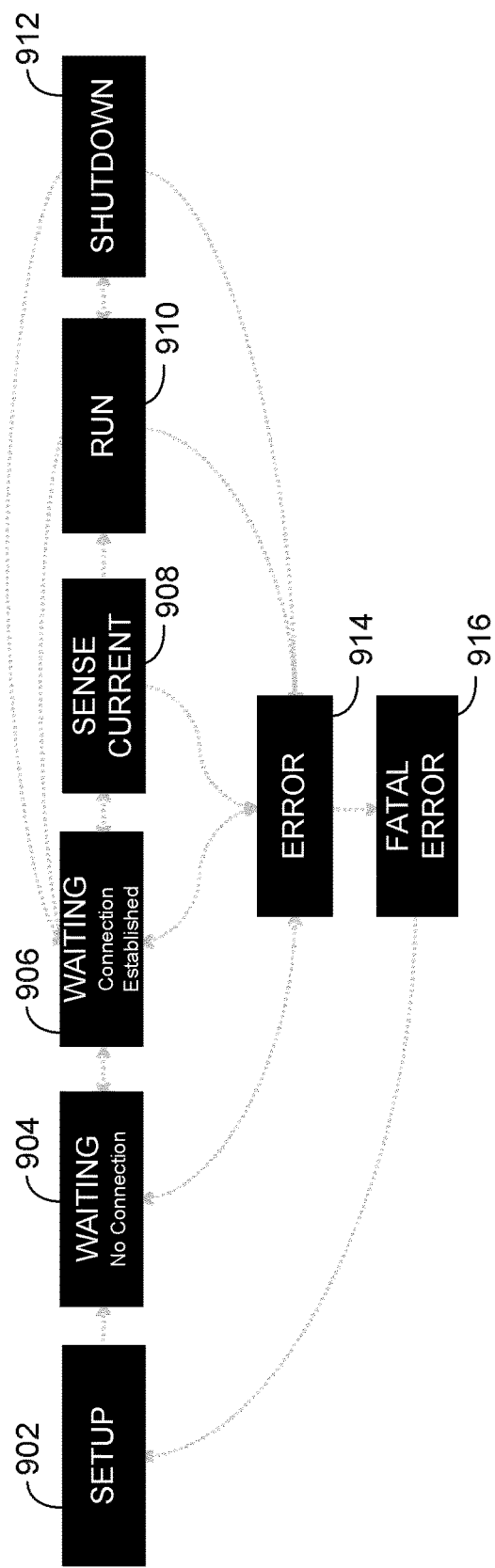
FIG. 9 illustrates an exemplary state diagram of a base charging unit.
Figure 10:
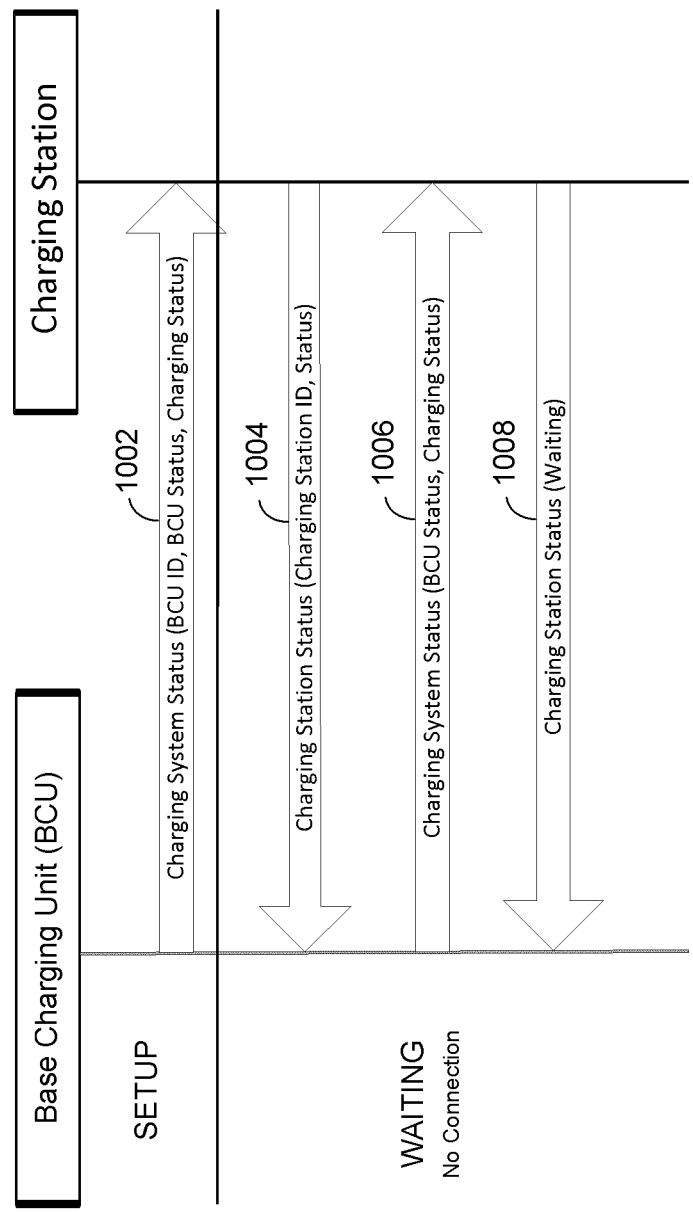
FIG. 10 illustrates an exemplary signal flow diagram illustrating signal flow exchanged among the various components of FIG. 8.

FIG. 9 illustrates an example of the various operational states that a BCU, such as the BCU 810 illustrated in FIG. 8, goes through during a charging cycle of the wireless power transfer system for transferring wireless power to an electric vehicle. The charging cycle can comprise a plurality of operational states comprising at least one initialization state during which a wireless power link sufficient for charging is established between the wireless power transfer system and the electric vehicle. The at least one initialization state can comprise at least one alignment state during which alignment of the electric vehicle with the wireless power transfer system is performed, as described more fully below. Upon initiation of the charging cycle, the BCU is in a Setup state 902. FIG. 10 illustrates an example of the Setup state 902 and the Waiting (No Connection) state 904, and an example of messages exchanged between the BCU and the charging station in the Setup and Waiting (No Connection) states. The BCU enters the Setup state 902 upon being powered up (e.g., upon initiation of the charging cycle). During the Setup state 902, the power supply may perform setup tasks, including initializing a communications module (e.g., a Bluetooth module) for communicating with one or more electric vehicles. During this operational state, the BCU may not accept any input. The Setup state 902 may last up to 5 seconds and may end automatically once the setup has been completed. At the end of the Setup state, the BCU may send a Charging System Status message 1002 to the Charging Station indicating to the Charging Station the BCU ID, the BCU status, and Charging status. Upon receipt of the Charging System Status message 1002, the charging station may send a Charging Station Status message 1004 back to the BCU with its own unique ID and status. The Charging Station Status message 1004 may be transmitted during the Setup state 902 or during the Waiting (No Connection) state 904.

In the Waiting (No Connection) state 904, the BCU may wait for a network connection (e.g., a Bluetooth connection). In this operational state, the BCU may periodically check the health of various sub-systems, such as the controller 812, base power conversion 814, base pad 822, etc. illustrated in FIG. 8, and may send a Charging System Status message 1006 to the Charging Station indicating the operational status of the Charging System (e.g., the BCU status and Charging status). The BCU may check the health of the various subsystems every X seconds (e.g., every 5 seconds), and the BCU may transmit a Charging System Status message to the Charging Station indicating the operational status of the Charging System each time the health of the subsystems is checked. The particular operational status (e.g., no error or specific fault) may be conveyed with an appropriate diagnostic code as part of the message. Upon receipt of a Charging System Status message, the Charging Station may transmit a Charging Station Status message 1008 back to the BCU indicating the operational status of the Charging Station sub-systems, such as controller 806, a GUI/communications module, etc. The Charging Station may maintain the status of BCU as "unavailable" until the Charging Station receives a Charging System Status message from BCU. In some aspects, if the Charging Station does not receive a Charging System Status message from BCU for a particular number of consecutive reporting periods (e.g., at least two consecutive reporting periods), the Charging Station may mark the status of BCU as "unavailable." In some aspects, the status of the BCU may be reported by the Charging Station to external sources, such as servers 816 or a remote user device 820 via network 818. Similarly, until the BCU receives a Charging Station Status message from Charging Station, the BCU may maintain the status of Charging Station as "unavailable." In some aspects, if the BCU does not receive a Charging Station Status message from Charging Station for a particular number of consecutive reporting periods, it shall mark the status of Charging Station as "unavailable." In some aspects, the receipt of a Charging System Status message or a Charging Station Status message may update the status and reset the reporting period.

Figure 11:
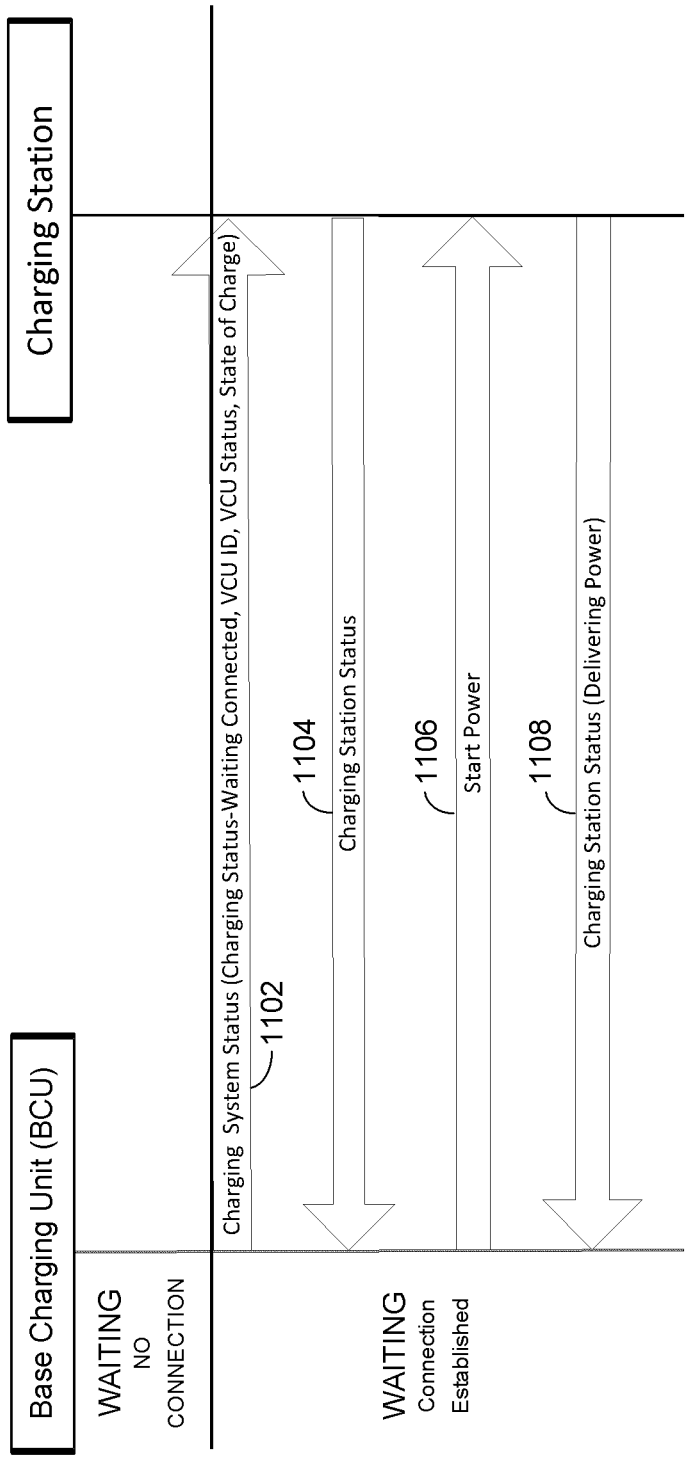
FIG. 11 illustrates another exemplary signal flow diagram illustrating signal flow exchanged among the various components of FIG. 8.

FIG. 11 illustrates an example of the Waiting (Connection Established) state 906 and messages exchanged between the BCU and the charging station in the Waiting (Connection Established) state 906. The BCU may transition to this operational state when an electric vehicle approaches the charging station and a vehicle charging unit (VCU), such as the VCU illustrated in FIG. 8, establishes a network connection with the BCU, for example, using antennas 830 and 832 as described above. Once the network connection is established, the VCU may send its unique ID and status to the BCU using a VCU Status message (not shown). Upon receipt of the VCU Status message, the BCU may update the Charging System status (e.g., "vehicle connected") and store the VCU ID and may also update the VCU status. The BCU may also transmit the status of the BCU and the last status of Charging system to the VCU. In the Waiting (Connection Established) state 906, the BCU may also transmit a Charging System Status message 1102 to the Charging Station indicating the Charging Status (e.g., "Vehicle Connected" or "Waiting Connected") and receive a Charging Station Status message 1104 from the Charging Station indicating the updated status of the Charging Station. Upon completion of exchange of status messages between the BCU and Charging Station, if it is determined that there are no faults or errors, the BCU may send a "Start Power" message 1106 to the Charging Station. Upon receipt of the "Start Power" message, the Charging Station may send a Charging Station Status message 1108 back to the BCU indicating that the Charging Station Power State has been changed to "delivering power" and that the message has been successfully received. The Charging Station may then begin delivering mains power to the BCU. In some aspects, the Charging Station may deliver power to a power supply unit (PSU) that provides the power to the BCU or directly to the base pad. In some aspects, if the BCU does not receive a status message from the Charging Station within a certain amount of time (e.g., 10 milliseconds), the BCU may retry a particular amount of times (e.g., 2 times) before updating the Charging System status with Charging Station as "unavailable" and report the updated status of the Charging Station to VCU.

In some aspects, during the Waiting (Connection Established) state 906, if the VCU disconnects from the BCU and the Charging Station is currently delivering mains power to the BCU, the BCU may send a "Stop Power" message to the Charging Station. Upon receipt of the "Stop Power" message, the Charging Station may stop delivering mains power to the BCU, or the PSU, and send a Charging Station Status message to the BCU with the Charging Station Status as "waiting." In some aspects, the BCU may update the Charging System status with "vehicle disconnected" and may clear the VCU ID. In some aspects, the BCU may transition back to the Waiting (No Connection) state 904.

Figure 12:
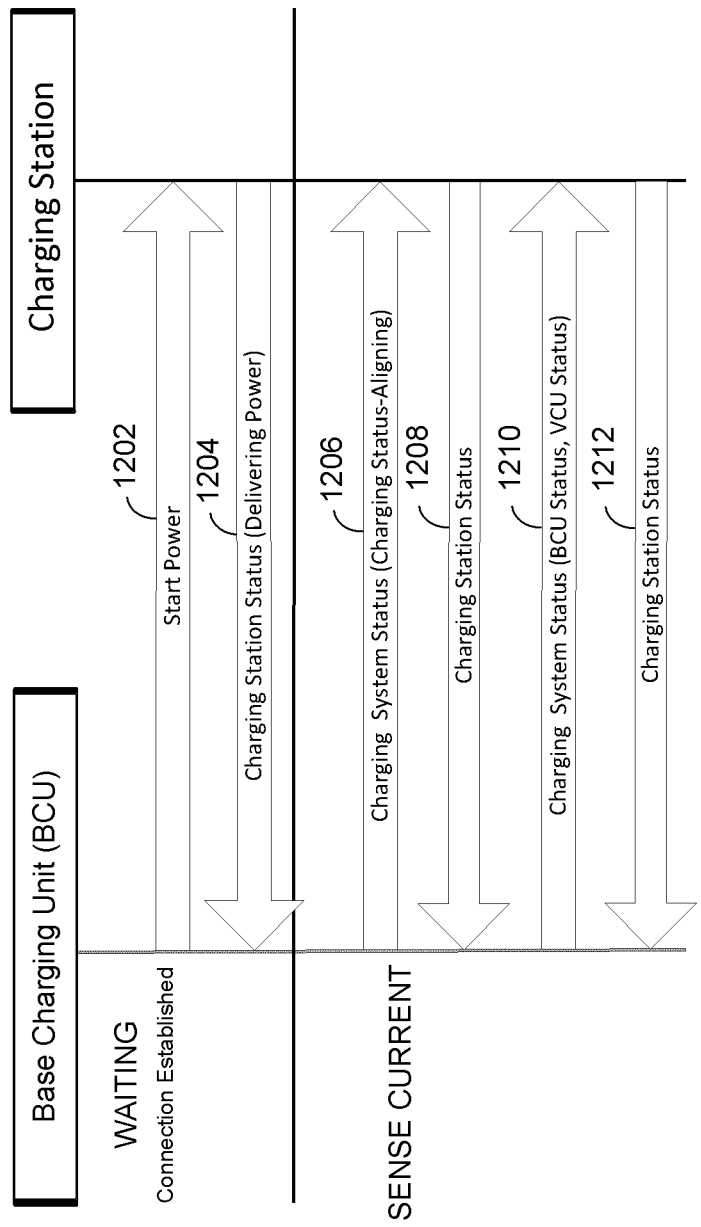
FIG. 12 illustrates another exemplary signal flow diagram illustrating signal flow exchanged among the various components of FIG. 8.

FIG. 12 illustrates an example of the Sense Current state 908 and messages exchanged between the BCU and the charging station in the Sense Current state 908. The Sense Current state 908 can also be referred to as an alignment state, and the at least one initialization state of the charging cycle can include at least one alignment state (e.g., during which alignment of the electric vehicle with the wireless power transfer system is performed). The BCU may transition to the Sense Current state 908 when the Charging Station Status message 1204 (or Status message 1108) is received from the Charging Station in response to the "Start Power" message 1202 (or "Start Power" message 1106). In the Sense Current state 908, the BCU transmits the received power at a first power level sufficient to align the base pad including a base system induction coil with the vehicle pad including an electric vehicle induction coil. Any current level may be used that is sufficient to provide enough power to align the base pad with the vehicle pad. For example, the BCU may energize the base pad including the base system induction coil with a current that is nominally 10% of the maximum track current. In some aspects, the BCU may energize the base pad with a current that is less than 10%, less than 50%, between 5% and 15%, or between 40% and 60% of a maximum threshold level (e.g., the maximum track current, a specified safety level, etc.). In another example, the BCU may energize the base pad with a current that is nominally 50% of the maximum track current. In some aspects, the BCU may stay in the Sense Current state 908 until the VCU requests that the power be shut down, in which case the operational state will transition back to the Waiting (Connection Established) state 906 or the Waiting (No Connection) state 904. In some aspects, the Sense Current state 908 may last until the VCU requests that power transfer (e.g., charging of the electric vehicle) begins, in which case the state will transition to the Run state 910. In the Sense Current state 908, the BCU may continue to periodically send and receive the status to and from the Charging Station as indicated in FIG. 12 and update the status of the Charging Station based on the messages. The Charging Station may also update the status of the BCU and the VCU based on the received status messages. For example, the BCU may transmit a Charging System Status message 1206 to the Charging Station indicating that the charging status of the Charging System is "aligning." The Charging Station may respond with a Charging Station Status message 1208 indicating that the Charging Station is continuing to "Deliver Power" or, if the VCU has requested that the power be shut down, indicating that the Charging Station is "waiting." The BCU may send status message 1210 and receive status message 1212 every X seconds (e.g., every 2 seconds) in order to update the Charging System status and the Charging Station status.

Figure 13:
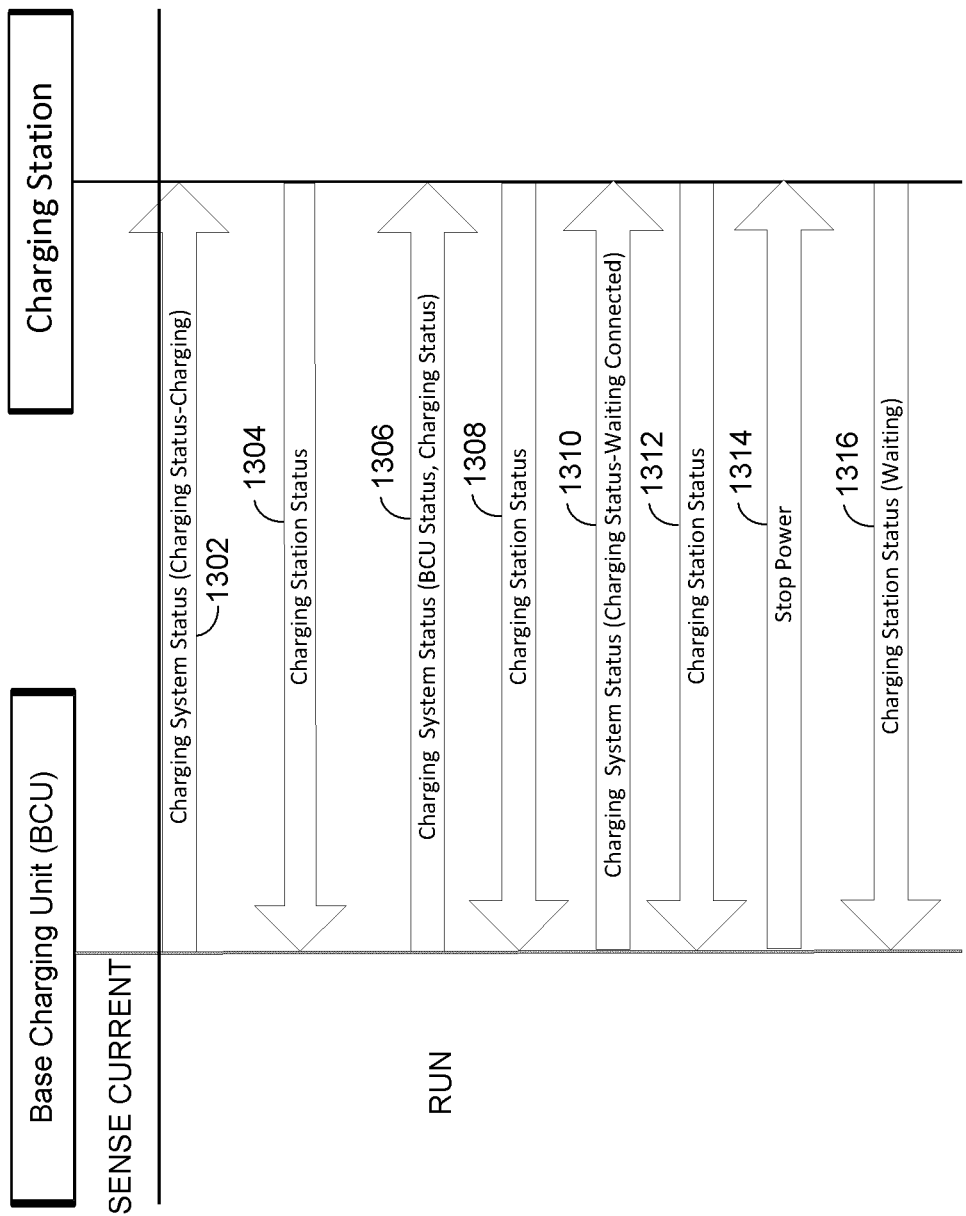
FIG. 13 illustrates another exemplary signal flow diagram illustrating signal flow exchanged among the various components of FIG. 8.

FIG. 13 illustrates an example of the Run state 910 and messages exchanged between the BCU and the charging station in the Run state 910. The Run state 910 can also be referred to as a charging state, and the charging cycle can comprise at least one charging state (e.g., during which wireless power transfer from the wireless power transfer system to the electric vehicle is performed). In some aspects, the BCU may transition to the Run state 910 upon being commanded by the VCU. In some aspects, the BCU may transition to the Run state 910 upon being commanded by the Charging Station. Upon entering the Run state 910, the BCU may transmit a Charging System Status message 1302 to the Charging Station indicating the Charging Status as "Charging Started." In some aspects, in response to receiving the command to begin charging from the VCU or the Charging Station, the BCU may transmit power to the vehicle charging unit at a second power level sufficient to charge or power the electric vehicle. For example, the BCU may energize the base pad including the base system induction coil with a current that is sufficient to charge or power the electric vehicle, which can be nominally up to 100% of the maximum track current (e.g., at least 50%, at least 60%, at least 70%, at least 80%, at least 90%, etc. of the maximum track current). For example, during the at least one alignment state of the at least one initialization state, the base pad can be energized with a first current, and during the at least one charging state, the base pad can be energized with a second current greater than the first current.

In some aspects, a first timestamp associated with the transition to the Run state 910 may be generated by the BCU or the Charging Station, and may be reported by the BCU or the Charging Station to external sources, such as servers 816 or a remote user device 820 via network 818, to indicate the time when charging was actually started for the electric vehicle. This timestamp may be referred to as a "charging begin timestamp." For example, this first timestamp can indicate a start time of the wireless power transfer (e.g., in response to entering at least one charging state of the charging cycle).

In the Run state 910, the BCU may continue to periodically send and receive status messages to and from the Charging Station as indicated in FIG. 13. For example, after receiving a command to begin charging from the VCU or the Charging Station, the BCU may transmit a Charging System Status message 1302 to the Charging Station indicating that the charging status of the Charging System is "charging." If the Charging Station is not delivering power, the Charging Station may begin delivering power to the BCU or the PSU. Upon receiving the status message 1302, the Charging Station may generate the first timestamp and may respond with a Charging Station Status message 1304 indicating the Charging Station Status as "Deliver Power." Upon receiving the status message 1034, the BCU may update the status of the Charging Station. The BCU may continue to periodically send status messages, such as status message 1306, and receive status messages, such as status message 1308, to and from the Charging Station and update the status of the Charging Station based on the messages. The Charging Station may also update the status of the BCU and the VCU based on the received status messages. The BCU may receive a request from a VCU that the power be shut down, and may transmit a Charging System Status message 1310 to the Charging Station indicating that the Charging System status and BCU state is "Waiting (Connection Established)." The Charging Station may respond with a Charging Station Status message 1312 indicating that the Charging Station status is "Waiting." Upon completion of charging of an electric vehicle, or upon receiving a Shutdown command or an error, the BCU may transmit a "Stop Power" status message 1314 to the Charging Station, upon which the Charging Station may respond with a Charging Station status message 1316 indicating that the Charging Station status is "Waiting." The BCU may send status message 1210 and receive status message 1212 every X seconds (e.g., every 2 seconds) in order to update the Charging System status and the Charging Station status. Messages 1310, 1312, 1314, and 1316 may occur during a subsequent state, such as the Shutdown state 912 or error states 914 and/or 916.

In some aspects, the BCU may move to a Shutdown state 912 upon being commanded by the VCU. Upon entering the Shutdown state 912, the BCU may set the track current to zero and may await instruction from the VCU. In some aspects, the BCU may command the Charging Station to set the track current to zero. The BCU may transmit a status message, such as status message 1310 or 1314, to the Charging Station indicating a "Charging Stopped" status.

Upon entering the Shutdown state 912, a second timestamp associated with this event may be generated by the BCU or the Charging Station, and may be reported by the BCU or the Charging Station to external sources, such as servers 816 or a remote user device 820 via network 818, to indicate the time when charging was actually stopped for the electric vehicle. This second timestamp may be referred to as a "charging end timestamp." For example, this second timestamp can indicate an end time of the wireless power transfer.

The charging begin timestamp (e.g., the first timestamp) and the charging end timestamp (e.g., the second timestamp) may allow the charging station, the BCU, and/or external sources, such as servers 816, to generate a cost for a user for the charging of the electric vehicle based at least in part on the first and second timestamps (e.g., based on a length of time between the times denoted by the first timestamp and the second timestamp, based on one or both of the first and second timestamps denoting a time during a peak power usage period or a non-peak power usage period). The use of timestamps at the beginning and end of actual charging of the vehicle (as opposed to the beginning and end of any energizing of the base pad) may allow a more accurate indication of the duration of the at least one charging operational state or the charging power consumed by the electric vehicle user. For example, the user may not be charged for the power used during the alignment of the base pad and vehicle pad so the cost would include a charge for power used during the at least one charging state and would not include a charge for power used during the at least one initialization state. In the Shutdown state 912, the BCU may continue to periodically send and receive status messages to and from the Charging Station and update the status of the Charging Station based on the messages. The Charging Station may also update the status of the BCU and the VCU based on the received status messages.

The BCU may transition to the Error state 914 from any of the other operational states. In some aspects, the BCU may exit the Error state 914 after the error condition has been deemed to be cleared. After the error condition has been cleared, the BCU may transition back to the Waiting states 904 or 906. For example, in the event of a thermal error (e.g., overheating), the BCU will remain in the Error state 914 until the equipment or power supply has cooled. In some aspects, for various types of errors (e.g., shoot-through, desaturation, computer failure, equipment malfunction, etc.), the BCU may remain in the Error state 914 for a fixed period of time, such as five seconds, one hour, etc. For example, the BCU may remain in the Error state 914 for a fifteen second period in order to give the supply time to equalize any thermal lag from shoot-through or desaturation conditions. In some aspects, the BCU may capture the appropriate error state in the Charging System status, and may continue to periodically send and receive status messages to and from the Charging Station and update the status of the Charging Station based on the messages. The Charging Station may also update the status of the BCU and the VCU based on the received status messages.

In some aspects, the BCU may transition to a Fatal Error state 916 if a particular event occurs, such as an unrecoverable "severe" error. In some aspects, the Fatal Error state 916 may be transitioned to if a normally recoverable error recurs several times in a short period of time. In the Fatal Error state 916, the BCU may be completely unresponsive to commands from any VCU and/or the Charging Station. In some aspects, the track current will return to or stay at zero. In some aspects, the BCU may be transitioned from Fatal Error state 916 by removing the mains power to the supply and then restarting the mains power.

In some aspects, the message protocol between the BCU and Charging Station may be Modbus ASCII over an RS-485 link. The message structure may include a series of ASCII character bytes. For example, messages sent from the Charging Station to the BCU may start with an ASCII "C" character. Messages sent from the BCU to the Charging station may start with the ASCII "P" character. The second character of the message may include a command character. The third character of the message may be equal to the previous character plus decimal 32. The fourth and subsequent bytes may be optional, and may hold data with a length and format that is dependent on the command character. In some aspects, if the message contains multiple data sets or parameters, then an ASCII "," may be used to separate the data sets or parameters and their values. The message may terminated with ASCII character <LF> or <CR>. In some aspects, all of the command characters may be defined as being uppercase ASCII characters, and the effect of third and fourth characters of the message may be that the third character of the message will be a lowercase version of the second. In some aspects, the commands between the BCU and the Charging Station are not explicitly acknowledged. For example, the BCU may be considered the master and may initiate all the commands. In response, the Charging Station may be expected to send a status message back in response to every message from the BCU, which serves as the acknowledgement.

In some aspects, the Vehicle Control Unit (VCU) may detect the Base Charging Unit (BCU) and establish a communication link with the BCU in order to transfer data therebetween using a communications protocol (e.g., Bluetooth, WiFi, etc.). In some aspects, a Generic Access Profile (GAP) may be used by the VCU and the BCU for the discovery and establishment of a communication link between them. The VCU and the BCU involved in establishing a communication link can take a generic notation. In some aspects, the BCU may be a slave unit and may transmit a beacon and the VCU may be a master and may attempt to connect to the BCU in response to receiving the beacon. In this case, the VCU may initiate the establishment of the physical communication link after receiving the beacon. The initiator (VCU) and the acceptor (BCU) may operate the generic procedures according to GAP profile.

Figure 14:
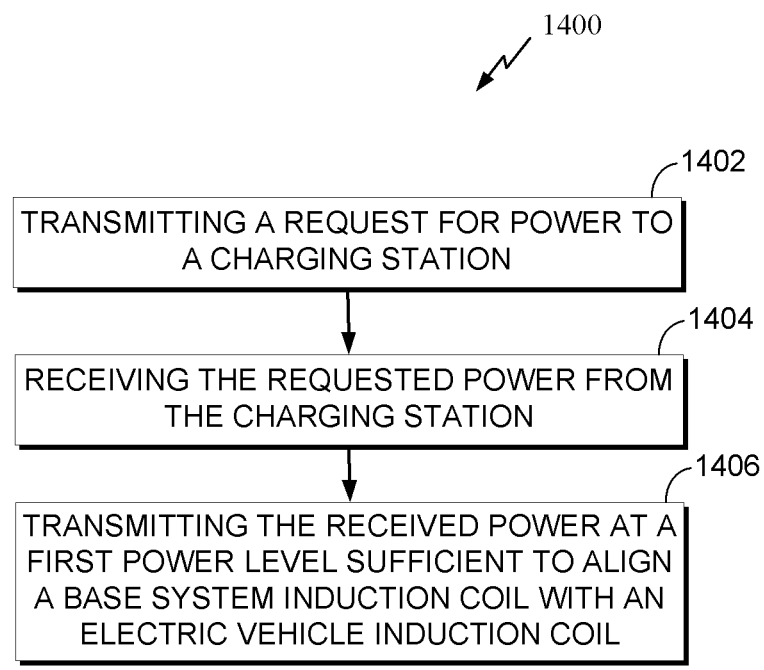
FIG. 14 illustrates a flowchart of an exemplary method of delivering wireless power to an electric vehicle.

FIG. 14 illustrates a flowchart 1400 of an exemplary method of delivering wireless power to an electric vehicle. At step 1402, the method begins by transmitting a request for power to a Charging Station (e.g., initiating a charging cycle of the wireless power transfer system). For example, a BCU may establish a communication link with a VCU. In response to receiving a request for power from the VCU, the BCU may transmit a request to a Charging Station requesting mains power. At step 1404, the method continues by receiving the requested power from the Charging Station. At step 1406, the method continues by transmitting the received power at a first power level sufficient to align a base system induction coil with an electric vehicle induction coil (e.g., in at least one alignment state during which alignment of the electric vehicle with the wireless power transfer system is performed). For example, the BCU may energize the base pad including a base system induction coil with a current that is nominally 10% of the maximum track current. This current may be sufficient to align the base pad and the electric vehicle pad. The alignment of the vehicle pad with the base pad can comprise configuring the base pad and the vehicle pad for the wireless power transfer. In some aspects, the BCU may cause the base pad to move in order to align the base pad with the vehicle pad. In some aspects, the BCU may cause the vehicle pad to move in order to align the vehicle pad with the base pad. In some aspects, the BCU may cause both the vehicle pad and base pad to move simultaneously or one at a time.

In some aspects, the method may also include receiving a first set of data from a VCU and transmitting, in response to first set of data, the received power to the VCU at a second power level sufficient to charge or power the electric vehicle (e.g., in at least one charging state during which wireless power transfer from the wireless power transfer system to the electric vehicle is performed). For example, the BCU may transition to the Run state 910 upon being commanded by the VCU or by the Charging Station. In response to receiving the command to begin charging from the VCU or the Charging Station, the BCU may energize the base pad including the base system induction coil with a current that is nominally up to 100% of the maximum track current in order to provide power to the VCU. In some aspects, the method may further include periodically transmitting charging status updates to the charging station and periodically receiving charging station status updates from the charging station and updating a status of the charging station in response to receiving the charging station status updates. In some aspects, the method may further include transmitting the received power at the first power level or the second power level until a request to shut down is received or an error or fatal error occurs.

Figure 15:
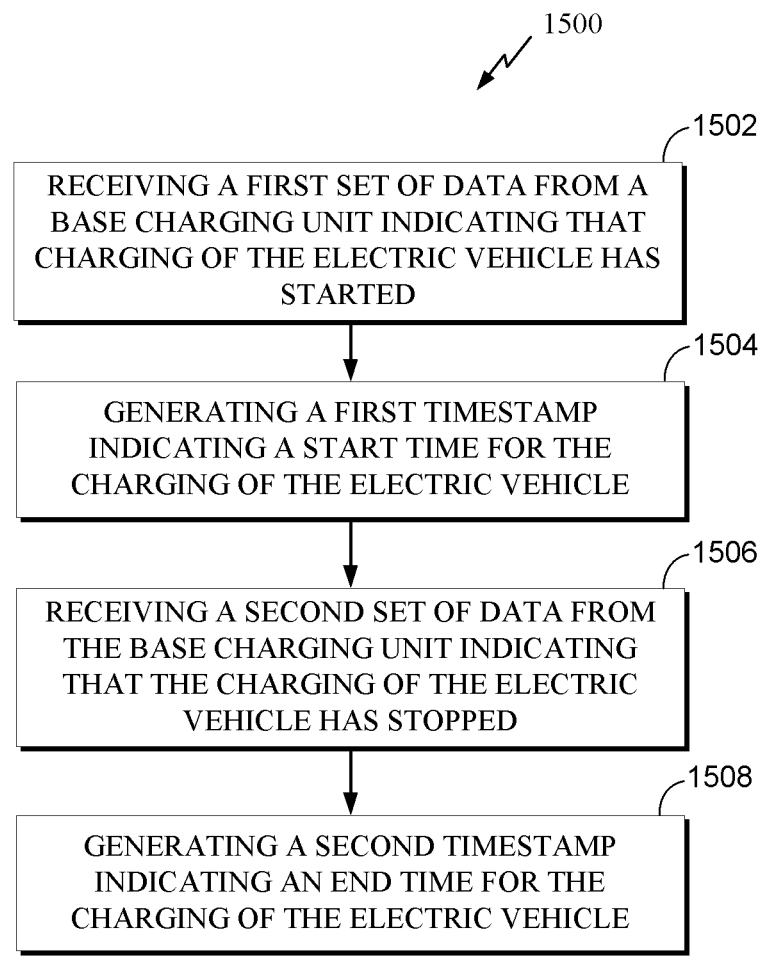
FIG. 15 illustrates a flowchart of an exemplary method of monitoring wireless power delivered to an electric vehicle.

FIG. 15 illustrates a flowchart 1500 of an exemplary method of monitoring wireless power delivered to an electric vehicle. At step 1502, the method begins by receiving a first set of data from a base charging unit indicating that charging of the electric vehicle has started. For example, the Charging Station may receive a Charging System Status message from a BCU indicating that the status is "Charging." At step 1504, the method continues by generating a first timestamp indicating a start time of the wireless power transfer for the charging of the electric vehicle. In some aspects, this timestamp may be referred to as a "charging begin timestamp." For example, a charging begin timestamp associated with the transition to the Run state 910 may be generated by the BCU or the Charging Station, and may be reported by the BCU or the Charging Station to external sources, such as servers 816 or a remote user device 820 via network 818, to indicate the time when charging was actually started for the electric vehicle.

At step 1506, the method continues by receiving a second set of data from the base charging unit indicating that the charging of the electric vehicle has stopped. For example, the Charging Station may receive a status message from the BCU indicating that the status of the Charging system is "Stop Power." The BCU may transmit the Stop Power status message in response to an error or in response to a command from a VCU to stop delivering power (e.g., if the electric vehicle is fully charged). At step 1508, the method continues by generating a second timestamp indicating an end time of the wireless power transfer for the charging of the electric vehicle. In some aspects, this timestamp may be referred to as a "charging end timestamp." For example, upon entering the Shutdown state 912, a charging end timestamp may be generated by the BCU or the Charging Station, and may be reported by the BCU or the Charging Station to external sources, such as servers 816 or a remote user device 820 via network 818, to indicate the time when charging was actually stopped for the electric vehicle.

The first "charging begin" timestamp and the second "charging end" timestamp may allow the charging station or the BCU to generate a cost for a user for the charging of the electric vehicle based at least in part on the first and second timestamps (e.g., based on a length of time between the times denoted by the first timestamp and the second timestamp, based on one or both of the first and second timestamps denoting a time during a peak power usage period or a non-peak power usage period). In some aspects, the method may further include periodically transmitting charging station status updates to the BCU and periodically receiving charging status updates from the BCU. In some aspects, the method further includes updating a status of the base charging unit and/or updating a status of a VCU of the electric vehicle in response to receiving the charging status updates. In some aspects, the method may further include receiving a third set of data from the base charging unit indicating that a base system induction coil is aligning with an electric vehicle induction coil of the electric vehicle. For example, prior to receiving the first set of data from the BCU, the method may receive data from the base charging unit indicating that the Charging System is in an "aligning" charging state.

Figure 16:
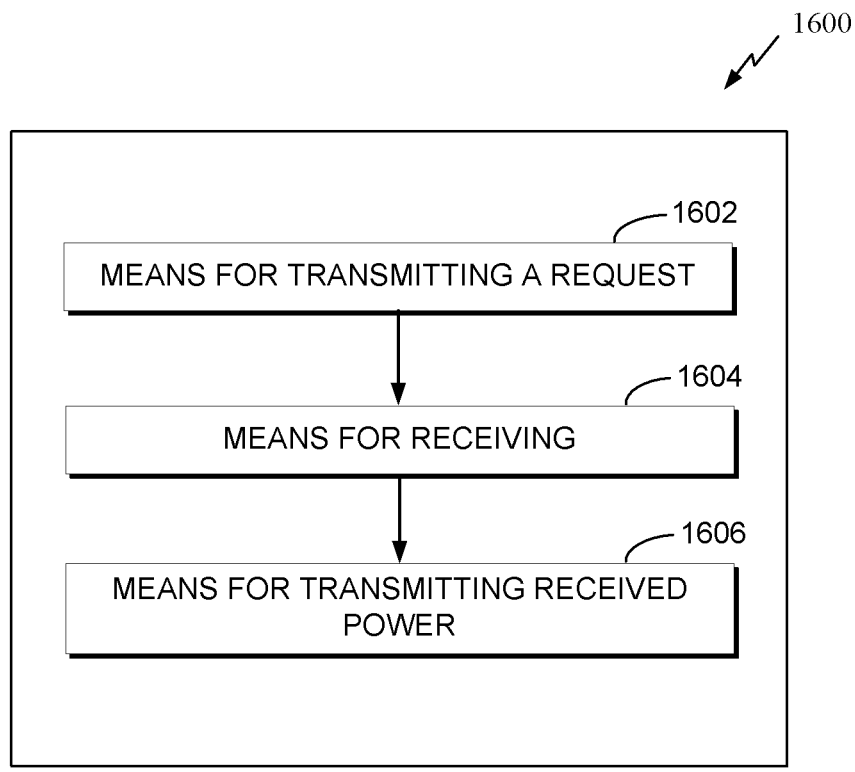
FIG. 16 illustrates a functional block diagram of an exemplary wireless power apparatus.

FIG. 16 is a functional block diagram of a wireless power apparatus 1600, in accordance with an exemplary embodiment of the invention. Those skilled in the art will appreciate that a wireless power apparatus may have more components than the simplified wireless communication device 1600 shown in FIG. 16. The wireless power apparatus 1600 shown includes only those components useful for describing some prominent features of implementations within the scope of the claims. Wireless power apparatus 1600 comprises means 1602 for transmitting a request, means 1604 for receiving, and means 1606 for transmitting received power for the various actions discussed with respect to FIGS. 1-15.

The means 1602 for transmitting a request may be configured to perform one or more of the functions discussed above with respect to block 1402 illustrated in FIG. 14. The means 1602 for transmitting a request may correspond to one or more of the antenna 830 and the controller 812, discussed above with respect to FIG. 8, and/or one or more of the base charging communication system 372, the base charging guidance system 362, and the base charging alignment system 352, discussed above with respect to FIG. 3. The means 1604 for receiving may be configured to perform one or more of the functions discussed above with respect to block 1404 illustrated in FIG. 14. The means 1604 for receiving may correspond to one or more of the antenna 830 and the controller 812, discussed above with respect to FIG. 8, and/or one or more of the base charging communication system 372, the base charging guidance system 362, and the base charging alignment system 352, discussed above with respect to FIG. 3. The means 1606 for transmitting received power may be configured to perform one or more of the functions discussed above with respect to block 1406 illustrated in FIG. 14. The means 1606 for transmitting received power may correspond to one or more of the controller 812, the base power conversion 814, and the base pad 822, discussed above with respect to FIG. 8, and/or one or more of the base charging system controller 342, the base charging system power converter, and the base system induction coil 304, discussed above with respect to FIG. 3.

Figure 17:
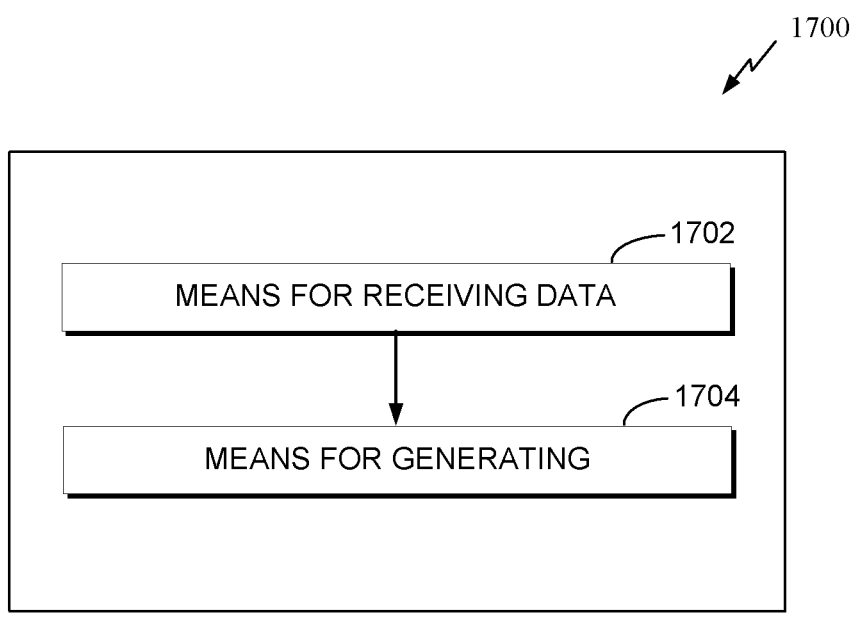
FIG. 17 illustrates a functional block diagram of an exemplary wireless power apparatus.

FIG. 17 is a functional block diagram of a wireless power apparatus 1700, in accordance with an exemplary embodiment of the invention. Those skilled in the art will appreciate that a wireless power apparatus may have more components than the simplified wireless communication device 1700 shown in FIG. 17. The wireless power apparatus 1700 shown includes only those components useful for describing some prominent features of implementations within the scope of the claims. Wireless power apparatus 1700 comprises means 1702 for receiving data and means 1704 for generating for the various actions discussed with respect to FIGS. 1-15.

The means 1702 for receiving data may be configured to perform one or more of the functions discussed above with respect to blocks 1502 and 1506 illustrated in FIG. 15. The means 1702 for receiving data may correspond to one or more of the antenna of the controller 806 and a GUI/communications module, discussed above with respect to FIG. 8. The means 1704 for generating may be configured to perform one or more of the functions discussed above with respect to blocks 1504 and 1508 illustrated in FIG. 15. The means 1704 for generating may correspond to one or more of the controller 806 and a GUI/communications module, discussed above with respect to FIG. 8.

Figure 18:
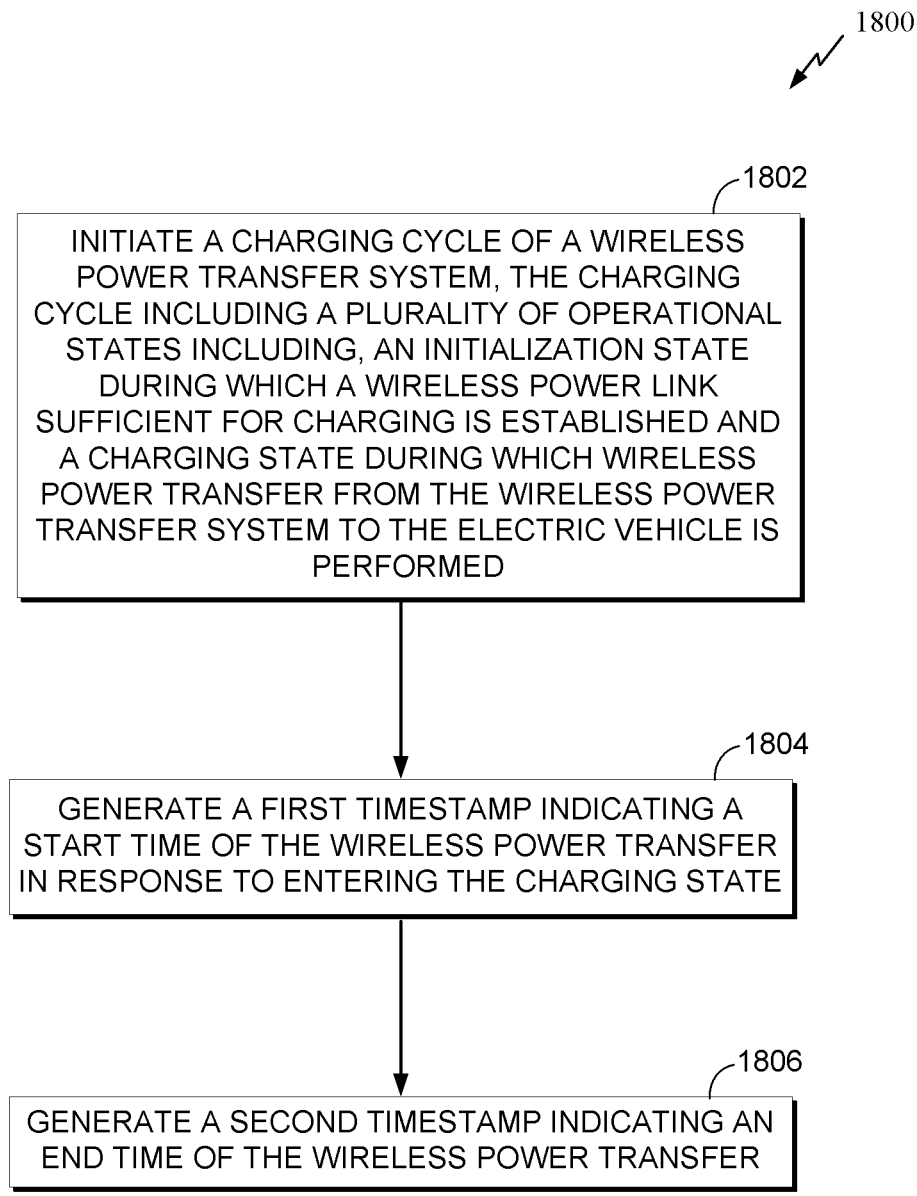
FIG. 18 illustrates a flowchart of an exemplary method of transferring wireless power to an electric vehicle.

FIG. 18 illustrates a flowchart of an exemplary method of transferring wireless power to an electric vehicle. At block 1802, a charging cycle of a wireless power transfer system is initiated. The charging cycle includes a plurality of operational states. The operational states include an initialization state during which a wireless power link sufficient for charging a vehicle is established. The operational states further include a charging state during which wireless power transfer from the wireless power transfer system to the electric vehicle is performed. In an aspect, the initialization state may include an alignment state during which alignment of the electric vehicle with the wireless power transfer system is performed. At block 1804, a first timestamp is generated. The first timestamp indicates a start time of the wireless power transfer in response to entering the charging state. The first timestamp may generated after an initialization state such that the first timestamp may comprise an indicator of when charging of a battery of a vehicle is established while excluding time spent for establishment of the charging connection (e.g., alignment). At block 1806, a second timestamp is generated. The second timestamp indicates an end time of the wireless power transfer.

The wireless power apparatus for charging an electric vehicle comprising a vehicle pad having at least one electric vehicle induction coil can comprise means for wirelessly transferring power from the apparatus to the vehicle pad (e.g., a base pad having at least one base system induction coil). The apparatus can further comprise means for controlling a charging cycle of the apparatus (e.g., at least one processor). The charging cycle can comprise at least one initialization state during which a wireless power link sufficient for charging is established between the wireless power apparatus and the electric vehicle. The at least one initialization state can comprise at least one alignment state during which alignment of the vehicle pad with the means for wirelessly transferring power is performed and at least one charging state during which wireless power transfer from the wireless power apparatus to the electric vehicle is performed. The apparatus can further comprise means for generating a first timestamp indicating a start time of the wireless power transfer in response to entering the at least one charging state (e.g., the at least one processor) and means for generating a second timestamp indicating an end time of the wireless power transfer (e.g., the at least one processor). The apparatus can further comprise means for generating a cost based at least in part on the first timestamp and the second timestamp (e.g., the at least one processor).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transferring wireless power to an electric vehicle, the method comprising:
   initiating a charging cycle of a wireless power transfer system, the charging cycle comprising a plurality of operational states comprising:
      at least one initialization state during which a wireless power link sufficient for transferring the wireless power is established between the wireless power transfer system and the electric vehicle, the at least one initialization state defining a first period of time during which a first amount of power is transferred; and
      at least one charging state during which wireless transfer of a second amount of power from the wireless power transfer system to the electric vehicle sufficient for charging is performed, the at least one initialization state comprising at least one alignment state during which alignment for the at least one charging state is performed, wherein, during the at least one alignment state, the first amount of the power is transmitted to the vehicle at a power level sufficient for the alignment;
   starting the at least one charging state;
   generating a first timestamp indicating a start time of the wireless power transfer upon starting the at least one charging state;
   ending the at least one charging state;
   generating a second timestamp indicating an end time of the wireless power transfer upon ending the at least one charging state; and
   generating a cost of the wireless power transferred to the vehicle based on excluding the first amount of the power transmitted to the vehicle during the first period.

2. The method of claim 1, wherein the wireless power transfer system comprises a base pad having at least one base system induction coil and the electric vehicle comprises a vehicle pad having at least one electric vehicle induction coil, and the alignment comprises alignment of the vehicle pad with the base pad to configure the base pad and the vehicle pad for the wireless power transfer.

3. The method of claim 2, wherein, during the at least one alignment state, the base pad is energized with a first current, and during the at least one charging state, the base pad is energized with a second current greater than the first current.

4. The method of claim 3, wherein the first current is less than 10% of the second current.

5. The method of claim 3, wherein the first current is less than 50% of the second current.

6. The method of claim 3, wherein the first current is between 5% and 15% of the second current or between 40% and 60% of the second current.

7. The method of claim 3, wherein the second current is sufficient to charge or power the electric vehicle.

8. The method of claim 7, wherein the wireless power transfer station has a maximum track current and the second current is at least 50%, at least 60%, at least 70%, at least 80%, or at least 90% of the maximum track current.

9. The method of claim 1, further comprising generating a cost based at least in part on the first timestamp and the second timestamp.

10. The method of claim 9, wherein the cost includes a charge for power used during the at least one charging state and does not include a charge for power used during the at least one initialization state.

11. A wireless power apparatus for charging an electric vehicle comprising a vehicle pad having at least one electric vehicle induction coil, the apparatus comprising:
   a base pad having at least one base system induction coil; and
   a processor configured to:
      control a charging cycle of the apparatus, the charging cycle comprising at least one initialization state during which a wireless power link sufficient for transferring the wireless power is established between the wireless power apparatus and the electric vehicle, the at least one initialization state defining a first period of time during which a first amount of the power is transferred, and at least one charging state during which wireless transfer of a second amount of power from the wireless power apparatus to the electric vehicle sufficient for charging is performed, the at least one initialization state comprising at least one alignment state during which alignment for the at least one charging state is performed, wherein, during the at least one alignment state, the first amount of the power is transmitted to the vehicle at a power level sufficient for the alignment;

start the at least one charging state;

generate a first timestamp indicating a start time of the wireless power transfer upon starting the at least one charging state;

end the at least one charging state;

generate a second timestamp indicating an end time of the wireless power transfer upon ending the at least one charging state; and generate a cost of the wireless power transferred to the vehicle based on excluding the first amount of the power transmitted to the vehicle during the first period.

12. The apparatus of claim 11, wherein the alignment comprises alignment of the vehicle pad with the base pad.

13. The apparatus of claim 12, wherein, during the at least one alignment state, the base pad is energized with a first current, and during the at least one charging state, the base pad is energized with a second current greater than the first current.

14. The apparatus of claim 13, wherein the first current is less than 10% of the second current.

15. The apparatus of claim 13, wherein the first current is less than 50% of the second current.

16. The apparatus of claim 13, wherein the first current is between 5% and 15% of the second current or between 40% and 60% of the second current.

17. The apparatus of claim 13, wherein the second current is sufficient to charge or power the electric vehicle.

18. The apparatus of claim 13, wherein the wireless power apparatus has a maximum track current and the second current is at least 50%, at least 60%, at least 70%, at least 80%, or at least 90% of the maximum track current.

19. The apparatus of claim 12, wherein the alignment of the vehicle pad with the base pad comprises configuring the base pad and the vehicle pad for the wireless power transfer.

20. The apparatus of claim 11, wherein the processor is further configured to generate a cost based at least in part on the first timestamp and the second timestamp.

21. The apparatus of claim 20, wherein the cost includes a charge for power used during the at least one charging state and does not include a charge for power used during the at least one initialization state.

22. A wireless power apparatus for charging an electric vehicle comprising a vehicle pad having at least one electric vehicle induction coil, the apparatus comprising:

means for wirelessly transferring power from the apparatus to the vehicle pad;

means for controlling a charging cycle of the apparatus, the charging cycle comprising at least one initialization state during which a wireless power link sufficient for transferring the wireless power is established between the wireless power apparatus and the electric vehicle, the at least one initialization state defining a first period of time during which a first amount of the power is transferred, and at least one charging state during which wireless transfer of a second amount of power from the wireless power apparatus to the electric vehicle sufficient for charging is performed, the at least one initialization state comprising at least one alignment state during which alignment for the at least one charging state is performed, wherein, during the at least one alignment state, the first amount of the power is transmitted to the vehicle at a power level sufficient for the alignment;

means for starting the at least one charging state;

means for generating a first timestamp indicating a start time of the wireless power transfer upon starting the at least one charging state;

means for ending the at least one charging state;

means for generating a second timestamp indicating an end time of the wireless power transfer upon ending the at least one charging state; and means for generating a cost of the wireless power transferred to the vehicle based on excluding the first amount of the power transmitted to the vehicle during the first period.

23. The apparatus of claim 22, wherein the alignment comprises alignment of the vehicle pad with the means for wirelessly transferring power.

24. The apparatus of claim 22, wherein the means for wirelessly transferring power comprises a base pad having at least one base system induction coil.

25. The apparatus of claim 22, wherein the means for controlling the charging cycle comprises at least one processor.

26. The apparatus of claim 25, wherein the means for generating the first timestamp comprises the at least one processor.

27. The apparatus of claim 25, wherein the means for generating the second timestamp comprises the at least one processor.

28. The apparatus of claim 22, further comprising means for generating a cost based at least in part on the first timestamp and the second timestamp.

29. A non-transitory computer-readable medium comprising instructions that, when executed by one or more processors, cause a wireless power transfer system for charging an electric vehicle to:

initiate a charging cycle comprising a plurality of operational states comprising:

at least one initialization state during which a wireless power link sufficient for transferring the wireless power is established between the wireless power transfer system and the electric vehicle, the at least one initialization state defining a first period of time during which a first amount of the power is transferred; and at least one charging state during which wireless power transfer of a second amount of power from the wireless power transfer system to the electric vehicle sufficient for charging is performed, the at least one initialization state comprising at least one alignment state during which alignment for the at least one charging state is performed, wherein, during the at least one alignment state, the first amount of the power is transmitted to the electric vehicle at a power level sufficient for the alignment;

start the at least one charging state;

generate a first timestamp indicating a start time of the wireless power transfer upon starting the at least one charging state;

end the at least one charging state;

generate a second timestamp indicating an end time of the wireless power transfer upon ending the at least one charging state; and generate a cost of the wireless power transferred to the vehicle based on excluding the first amount of the power transmitted to the vehicle during the first period.

30. The non-transitory computer-readable medium of claim 29, wherein the alignment comprises alignment of the electric vehicle with the wireless power transfer system.

31. The non-transitory computer-readable medium of claim 29, further comprising instructions that, when executed by the one or more processors, cause the wireless power transfer system to generate a cost based at least in part on the first timestamp and the second timestamp.

* * * * *